US009703943B2

(12) United States Patent
Saraf et al.

(10) Patent No.: US 9,703,943 B2
(45) Date of Patent: *Jul. 11, 2017

(54) PRE-AUTHENTICATED CALLING FOR VOICE APPLICATIONS

(71) Applicant: MICROSOFT TECHNOLOGY LICENSING, LLC, Redmond, WA (US)

(72) Inventors: Tal Saraf, Seattle, WA (US); Gurdeep Singh Pall, Medina, WA (US); Anand Ramakrishna, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,174

(22) Filed: Nov. 9, 2013

(65) Prior Publication Data

US 2014/0096209 A1    Apr. 3, 2014

Related U.S. Application Data

(63) Continuation of application No. 11/789,846, filed on Apr. 26, 2007, now Pat. No. 8,695,074.

(51) Int. Cl.
*H04L 12/66* (2006.01)
*G06F 15/16* (2006.01)
(Continued)

(52) U.S. Cl.
CPC .............. *G06F 21/41* (2013.01); *H04L 63/08* (2013.01); *H04L 63/0815* (2013.01); *H04L 65/1006* (2013.01)

(58) Field of Classification Search
CPC . H04L 65/1006; H04L 63/08; H04L 63/0815; H04W 12/06; G06F 21/41
(Continued)

(56) References Cited

U.S. PATENT DOCUMENTS 6,466,654 B1    10/2002    Cooper et al.
6,842,449 B2     1/2005    Hardjono
(Continued)

FOREIGN PATENT DOCUMENTS

KR    10-2005-0001971 A    1/2005
KR    10-2005-0019647 A    3/2005
(Continued)

OTHER PUBLICATIONS

"Office Action Received for European Patent Application No. 08745189.4", Mailed Date: Jan. 8, 2015, 5 Pages.
(Continued)

*Primary Examiner* — Alexander Lagor

(57) ABSTRACT

Architecture for providing pre-authenticated information from an endpoint for subsequently authenticating a device and/or user associated with the previously-authenticated information. A pre-authentication module of the architecture can be a trust component as part of an application that facilitates the utilization of user information and/or endpoint information in a media session protocol message to replace information that would otherwise be gathered via a dialog. In the context of IP-based voice communications, a call can be made from a client that is pre-authenticable, and no longer requires that an IP-based telephone interact with the phone user to facilitate sign-on.

20 Claims, 14 Drawing Sheets

(51) Int. Cl.
*G06F 21/41* (2013.01)
*H04L 29/06* (2006.01)

(58) Field of Classification Search
USPC .............................................................. 726/5
See application file for complete search history.

(56) References Cited

U.S. PATENT DOCUMENTS

| | | | |
|---|---|---|---|
| 7,046,647 B2 | 5/2006 | Oba et al. | |
| 7,072,657 B2 | 7/2006 | Watanabe et al. | |
| 7,073,055 B1 | 7/2006 | Freed et al. | |
| 7,089,009 B1 | 8/2006 | Fauconnier | |
| 8,695,074 B2 | 4/2014 | Saraf et al. | |
| 2003/0005280 A1* | 1/2003 | Bobde et al. | 713/150 |
| 2003/0051133 A1 | 3/2003 | Pearson | |
| 2003/0108002 A1 | 6/2003 | Chaney et al. | |
| 2003/0163733 A1 | 8/2003 | Barriga-Caceres et al. | |
| 2004/0192309 A1 | 9/2004 | Watanabe et al. | |
| 2004/0248553 A1 | 12/2004 | Barkley et al. | |
| 2005/0096048 A1 | 5/2005 | Clare et al. | |
| 2005/0135624 A1 | 6/2005 | Tsai et al. | |
| 2005/0144482 A1 | 6/2005 | Anuszewski | |
| 2005/0254653 A1 | 11/2005 | Potashnik et al. | |
| 2006/0031494 A1* | 2/2006 | Marcus et al. | 709/225 |
| 2006/0069914 A1 | 3/2006 | Rupp et al. | |
| 2006/0083357 A1 | 4/2006 | Howell et al. | |
| 2006/0101098 A1 | 5/2006 | Morgan et al. | |
| 2006/0130126 A1 | 6/2006 | Touve et al. | |
| 2006/0281457 A1 | 12/2006 | Huotari et al. | |
| 2007/0150726 A1* | 6/2007 | Sinnreich et al. | 713/156 |
| 2007/0206741 A1 | 9/2007 | Tiliks et al. | |
| 2007/0245411 A1 | 10/2007 | Newton | |
| 2008/0046735 A1 | 2/2008 | Nedeltchev et al. | |
| 2008/0084870 A1 | 4/2008 | Taylor et al. | |
| 2008/0092215 A1* | 4/2008 | Soukup | H04L 63/0815 726/5 |

FOREIGN PATENT DOCUMENTS

| | | |
|---|---|---|
| WO | 2007/013966 A2 | 2/2007 |
| WO | 2007035846 A2 | 3/2007 |

OTHER PUBLICATIONS

"Office Action Received for European Patent Application No. 08745189.4", Mailed Date: Oct. 7, 2013, Filed Date: Apr. 5, 2008, 6 Pages.
"Office Action Received for European Patent Application No. 08745189.4", Mailed Date: May 20, 2014, Filed Date: Apr. 5, 2008, 4 Pages.
Aboudagga et al, "Fast roaming Authentication in Wireless LANS", https://www.cosic.esat.kuleuven.be/wissec2006/papers/30.pdf.
Bangolae et al., "Performance Study of Fast BSS Transition using IEEE", Date: 2006, pp. 737-742, ACM Press, New York, USA, http://delivery.acm.org/10.1145/1150000/1143696/p737-bangolae.pdf?key1=11436968&key2=0926491711&coll=GUIDE&dl=GUIDE&CFID=11689970&CFTOKEN=50159387.
Evans et al., "Wireless Networking Security: Open Issues in Trust Management Interoperation and Measurement", Date: 2006, http://people.eecs.ku.edu/~weichaow/Research/papers/Evans-Wang-IJSN-06.pdf.
Pack et al., "Pre-Authenticated Fast Handoff in a Public Wireless LAN Based on IEEE 802.1x Model1", http://mmlab.snu.ac.kr/~webmaster/publications/docs/pwc2002_shpack.pdf.
International Search Report mailed Aug. 21, 2008, 12 pages.
Hillenbrand, et al. "Voice over IP—Considerations for a Next Generation Architecture", EUROMICRO, Proceedings of the 31st EUROMICRO Conference on Software Engineering and Advanced Applications, 2005, pp. 386-395, IEEE Computer Society, Washington, DC, USA.
Tschofenig et al., "Using SAML to protect the session initiation protocol (SIP)," Network, IEEE, vol. 20, No. 5, pp. 14-17, Sep.-Oct. 2006 doi: 10.1109.MNET.2006.1705878.
Supplemental European Search Report for European Patent Application No. EP 08 74 5189, mailed May 31, 2012, 7 pages.
"Response to Office Action Received from European Patent Application No. 08745189.4", Mailed Date: Sep. 19, 2014, 11 Pages.
"First Office Action Issued in Chinese Patent Application No. 200880013200.3", Mailed Date: Jan. 25, 2011, 9 Pages.
"Third Office Action Issued in Chinese Patent Application No. 200880013200.3", Mailed Date: Nov. 15, 2011, 6 Pages.
"Fourth Office Action Issued in Chinese Patent Application No. 200880013200.3", Mailed Date: Feb. 16, 2012, 6 Pages.
"Response Filed for First Chinese Office Action in Patent Application No. 200880013200.3", Filed Date: Jan. 25, 2011, 12 Pages.
"Response Filed for Third Chinese Office Action in Patent Application No. 200880013200.3", Filed Date: Nov. 15, 2011, 8 Pages.
"Response Filed for Fourth Chinese Office Action in Patent Application No. 200880013200.3", Filed Date: Feb. 16, 2012, 12 Pages.
Hillenbrand, et al., "Voice over IP—Considerations for a Next Generation Architecture", In Proceedings of the 31st EUROMICRO Conference on Software Engineering and Advanced Applications, Aug. 30, 2005, pp. 8-15.
"Second Office Action Issued in Chinese Patent Application No. 200880013200.3", Mailed Date: Jul. 20, 2011, 6 Pages.
"Response Filed for Second Chinese Office Action in Patent Application No. 200880013200.3", Filed Date: Jan. 25, 2011, 12 Pages.
Chinese Notice of Allowance in 200880013200.3, mailed Jul. 24, 2012, 4 pages.
European Notice of Allowance in 08745189.4, mailed Oct. 14, 2015, 7 pages.
U.S. Appl. No. 11/789,846, Amendment and Response filed Sep. 11, 2010, 17 pages.
U.S. Appl. No. 11/789,846, Amendment and Response filed Jan. 21, 2011, 18 pages.
U.S. Appl. No. 11/789,846, Amendment and Response filed Jul. 14, 2012, 16 pages.
U.S. Appl. No. 11/789,846, Amendment and Response filed Jan. 13, 2013, 15 pages.
U.S. Appl. No. 11/789,846, Notice of Allowance mailed Jul. 11, 2013, 20 pages.
U.S. Appl. No. 11/789,846, Notice of Allowance mailed Nov. 22, 2013, 19 pages.
U.S. Appl. No. 11/789,846, Office Action mailed May 13, 2010, 18 pages.
U.S. Appl. No. 11/789,846, Office Action mailed Nov. 24, 2010, 22 pages.
U.S. Appl. No. 11/789,846, Office Action mailed Mar. 15, 2012, 23 pages.
U.S. Appl. No. 11/789,846, Office Action mailed Oct. 12, 2012, 26 pages.
U.S. Appl. No. 11/789,846, Advisory Action mailed Feb. 2, 2011, 3 pages.

* cited by examiner

PRE-AUTHENTICATED CALLING FOR VOICE APPLICATIONS

CROSS-REFERENCE TO RELATED APPLICATIONS

This application is a continuation of patent application Ser. No. 11/789,846 (now U.S. Pat. No. 8,695,074), entitled "PRE-AUTHENTICATED CALLING FOR VOICE APPLICATIONS", and filed Apr. 26, 2007, the entirety of which is incorporated by reference herein.

BACKGROUND

Technological advances in digital communications have revolutionized telephony by providing alternative means of voice communications than that provided by traditional analog telephone systems. For example, IP (Internet protocol) telephony is a form of telephony which uses the TCP/IP suite of protocols popularized by IP networks such as the Internet to transmit digitized voice data. The routing of voice conversations over the Internet or other IP networks is commonly called voice-over-IP (VoIP). Digital telephony was introduced to improve voice services, but was subsequently found to be very useful in the creation of new network services because of faster data transfer over telephone lines.

Media session protocols such as session initiation protocol (SIP) can be used for creating, modifying, and terminating IP sessions with one or more participants. SIP sessions can include IP telephone calls, multimedia distribution, and multimedia conferences. The SIP protocol solves a need for a signaling and call setup protocol for IP-based communications that supports call processing functions and features present in the public-switched telephone network by using proxy servers and user agents.

However, in such digital systems, authentication is important to prevent unauthorized users from accessing networks and network services. The authentication (or identity verification) of telephone callers and/or caller devices is a general problem for telephony services, automated or not. Since the implementation of ANI (automatic number identification) or the telephone number from which a call originates (commonly referred to as "caller id") is oftentimes not available, or more importantly, can be spoofed, voice applications and services typically have to implement methods of caller authentication that are both costly to develop and cumbersome to the user. Such methods include interactive dialogs where the user needs to provide a PIN, confidential information, and/or automated speaker verification (a costly technology in itself).

"Single sign-on" is a concept gaining popularity where an authentication module provides access to a multiplicity of services based on a single "sign-on" or authentication process. While this also has the goal of reducing the need to provide credentials to multiple services, it still requires at least one sign-on to take place. Given the ubiquitous nature of mobile devices (e.g., cell phones) and computing devices, vendors could gain a significant commercial advantage by providing a more efficient and effective authentication mechanism.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a pre-authentication module or application that removes the need for authentication dialogs that require user interaction by utilizing credentials available from a pre-authenticated or trusted endpoint (e.g., a SIP-capable server). This can also include the known security of the media session protocol, which can be a session initiation protocol (SIP) connection. In the context of IP-based voice communications, in that a call can now be made from a client that is pre-authenticable, no longer is it required that an IP-based telephone sign-on.

Generally, the pre-authentication module of the architecture can be an application that facilitates the utilization of user information and/or endpoint information in media protocol messages (e.g., SIP-based) to replace information that would otherwise be gathered via a dialog, in order to improve the efficiency of the communication and for enhancing security/privacy of communications.

Additionally, user profile information and personality information, for example, can be accessed to provide a more robust implementation, particularly in the context of an automated attendant and associated dialog.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
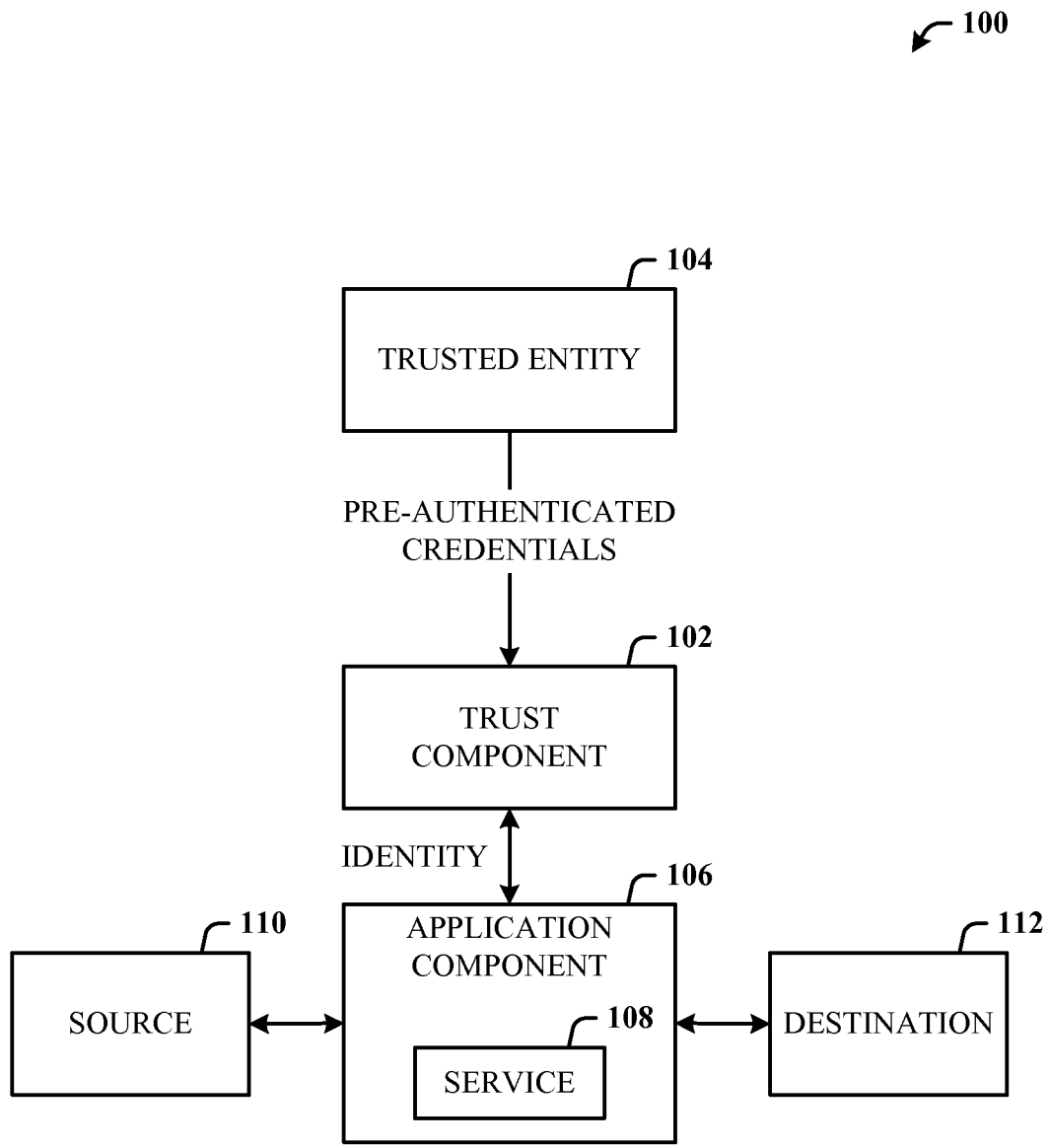
FIG. 1 illustrates a computer-implemented authentication system in accordance with the novel architecture.

The disclosed architecture eliminates the previously-required need to interact with dialog systems, for example, to provide information for obtaining access to a network and/or network services. Conventionally, for example, conference call applications typically require the entry of a participant code and/or leader code in order to join and/or enable the conference. These are cumbersome and oftentimes annoying user authentication steps. Contrary to conventional mechanisms, the disclosed architecture implements a call or communications application which can include a pre-authentication module that eliminates conventional authentication steps, at least for IP-based callers. The module can supply the identity of the caller in the media session protocol (e.g., session initiation protocol (SIP)) communications with the application over a secure connection (e.g., using TLS (transport security layer)).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented authentication system 100 in accordance with the novel architecture. The system 100 can include a trust component 102 for receiving and processing credentials from a trusted entity 104 that have already been authenticated (hence, pre-authenticated credentials). For example, the trusted entity 104 can be a source of log-in information such as username, password, PIN, network services, and so on. In other words, the trusted entity 104 is a component that has already authenticated a user and/or user device and provides the basis for communicating that trust in the form of pre-authenticated credentials.

Based on the entity 104 being a trusted entity, the trust component 102 processes the pre-authenticated credentials and sends at least identity information extracted therefrom or associated therewith to an application component 106. The application component 106 can be a single application or multiple applications of one or more system(s), each application of which can be associated with a service or functionality that is exposed based on the proper identity information. Once exposed, the service facilitates communications between a source 110 and a destination 112.

In one implementation, the trusted entity 104 can be a network service (e.g., a network log-in service) that has already processed access by the source 110 (e.g., a portable computer) to a network, for example. Thus, by utilizing this already-existing trust relationship, the trust component 102 will deem the source 110 an authenticated entity. Accordingly, in one general implementation, the trust component 102 can signal the application component 106 to expose the desired functionality thereby allowing connectivity and/or some level of communications between the source 110 and the destination 112.

In an alternative implementation, the trust component 102 sends more detailed information then a general signal to expose the application functionality such that the application component 106 can use the more detailed information for internally controlling or managing application processes or services for the source 110. For example, where the application component 106 is a suite of applications designed to work together, the more detailed information can include data that exposes functionality for only one of the applications but not another, or exposes a limited interface of a single application rather than all functionality of a single application. In other words, based on the amount and type of information communicated in the pre-authenticated credentials, or that is stored and can be retrieved using the pre-authenticated credentials, a wide variety of management and control can be obtained.

In another implementation, the system 100 is employed in the context of mobile or IP-based voice communications. Here, the trusted entity 104 can be a communications server disposed on a network, the pre-authenticated credentials include at least one of IP-based device identity data or user identity data, and the application service 108 facilitates voice communications between the source 110, which can be an IP-based capable phone or mobile device (e.g., a smartphone) and the destination 112, which can be another phone. In other words, the user has accessed the communications server (or trusted entity 104) directly (e.g., via the Internet) or indirectly via the application component 106 (e.g., a client communications application interface to the communications server) to initiate IP-based phone conversation to the destination 112.

As part of this process, the user should have had to successfully authenticate to the communications server (or trusted entity 104). Thus, once successfully authenticated to the communications server, the user should not be required to go through another log-in process, for example, but be allowed to obtain the functionality of the client application and complete the call through to the destination 112 unhindered by such conventional processes of multiple log-ins.

The pre-authenticated credentials can be communicated using a media session protocol such as SIP. Thus, the pre-authenticated credentials can include information beyond just a username, password, e-mail address, or PIN, for example, but also quality-of-service (QoS) information related to the subscriber subscription package and levels of service. For example, the QoS information, which can be retrieved based on the pre-authenticated credentials, can include the duration of the call (e.g., only twenty minutes), how to bill the IP-based call (e.g., credit card, calling card), where to send the call invoice information (e.g., via email to the user), and so on. Other information that can be sent in the pre-authenticated credentials or accessed using the pre-authenticated credentials can include personality information for implementation for the given call. This is described infra.

In other words, a communications platform (the trusted entity 104) which is passing the audio of the telephone call (e.g., SIP-based) to a receiving application can also provide or validate the originating user's authentication identity information. This enables the receiving application to treat the connection as authenticated. A scenario is that the user initiates a voice/data call from a device (e.g., SIP phone, smartphone running a communications application, a PC running a communications application, etc.). Since the user is authenticated due to the previous authentication of the communications platform or as a SIP user, the local or device application can bypass the login process based upon the existing identity received from the communications platform. The local or device application can then provide a different experience without requiring the extra conventional steps of authorization as current speech applications must do today.

Thus, a "single sign-on" is one of the benefits obtained by the implementation of an authentication system 100 that enables access to a multiplicity of services based on a single "sign-on" or authentication process. While this also has the goal of reducing the need to provide credentials to multiple services, one sign-on should be required to take place. In one example, a telephone sign-on is no longer required when a call is made from a client that has been pre-authenticated.

Figure 2:
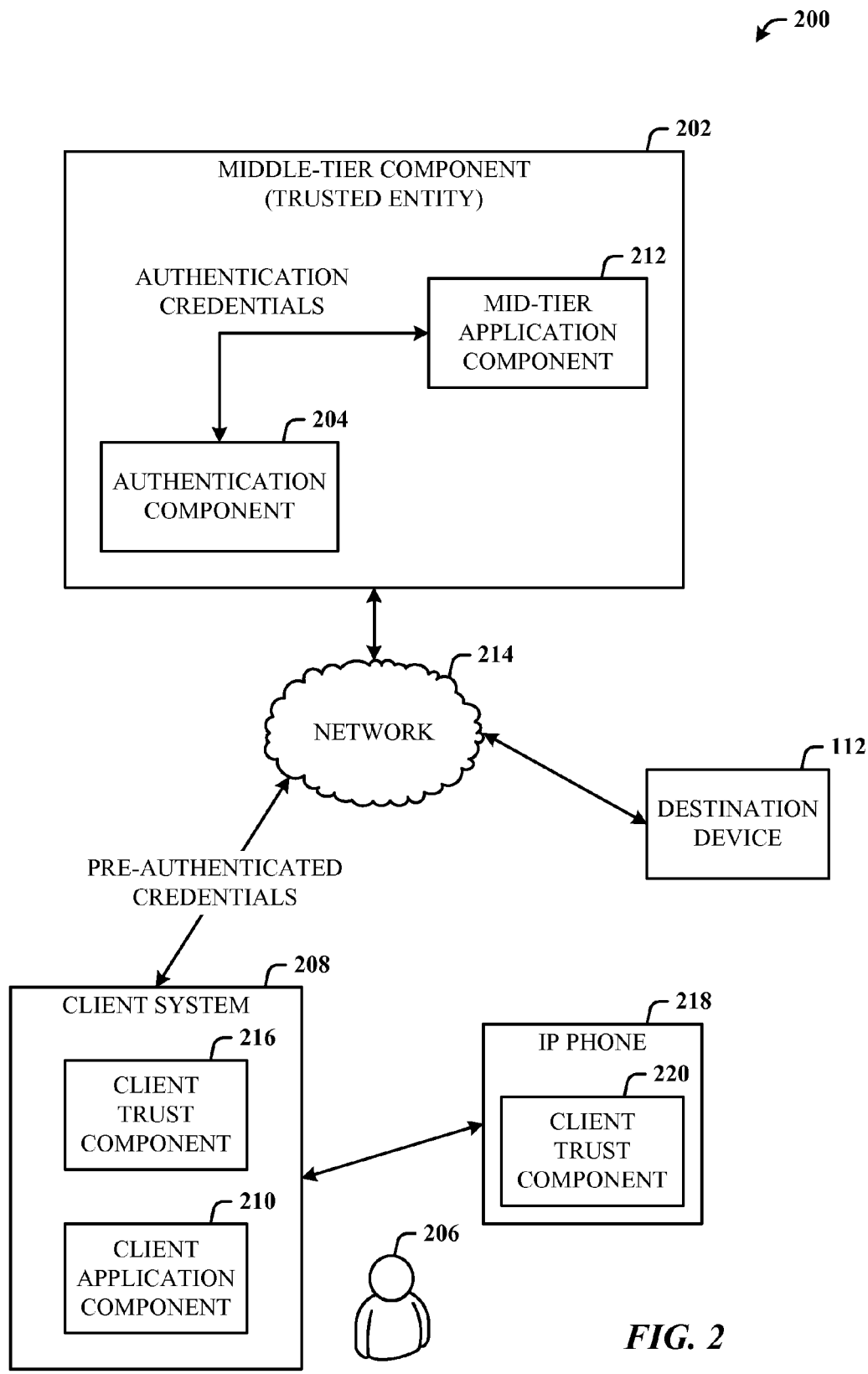
FIG. 2 illustrates a more detailed implementation of a system for pre-authentication processing.

FIG. 2 illustrates a more detailed implementation of a system 200 for pre-authentication processing. Here, the trusted entity 106 of FIG. 1 is illustrated as a middle-tier (or mid-tier) component 202 (e.g., IP-based web-accessible communications server) where initial authentication can take place. The mid-tier component 202 can include an authentication component 204 via which a user 206 of a client system 208 (e.g., computer) had previously interacted (e.g., for a login process) for creation of the authentication credentials. For example, the client user 206 can access the mid-tier component 202 via a client application component 210 to configure an IP-based call (e.g., voice-over-IP (VoIP)). The client application component 210 can include an application with an interface suitable for interfacing to a mid-tier application 212. The mid-tier application 212 can be configured to prompt the user for log-in information, for example. Based on the log-in information, the mid-tier authentication component 204 creates authentication credentials.

After configuring the desired process (e.g., an IP-based call) at the mid-tier component 202, the user 206 at the client system 208 can initiate IP communications via the client system 208 over an IP network 214 to the destination device 112 (e.g., a cell phone, VoIP phone). In response thereto, a client trust component 216 can receive the pre-authenticated credentials from the mid-tier component 202, thereby automatically allowing the user 206 to conduct IP voice communications from the client system 208 to the destination 112. The client trust component 216 can be triggered to seek the pre-authenticated credentials by the user interacting with the client application component 210. This provides a transparent authentication process for the user 206.

In yet another example, the user 206 desires to use a wire/wireless IP phone 218 to communicate to the destination 112. In this scenario, once the user 206 has configured the communications via the client system 208 to the mid-tier component 202, the pre-authenticated credentials are passed to the client trust component 216, which then can become the trusted entity relative to the IP phone 218. In other words, the pre-authenticated credentials can include information related to the IP phone 218 such that use of the phone 218 automatically triggers comparison of unique phone information with the phone information provided in the pre-authenticated credentials. Based on a successful verification, the phone 218 can now be used to communicate through the client system 208 to the destination 112. The IP phone can communicate via different conventional wireless technologies such as Bluetooth, WiFi, WiMax, and wired technologies such as USB, IEEE 1394, IEEE 802.3, and so on. The phone 218 can also include a phone trust component 220 that receives the same set of pre-authenticated credentials received by the client system 208 from the mid-tier component 202, or a modified set that also includes client system information that facilitates establishing a trusted relationship between the phone 218 and the client system 208.

The client trust components (216 and 220) can be in the form of individual and downloadable software components that facilitate obtainment of the pre-authenticated credentials benefits described herein. The clients trust components can be designed for suitable implementation for different types of systems such as computing systems and cell phones, IP phones, etc., essentially any device that includes at least voice communications capability.

Figure 3:
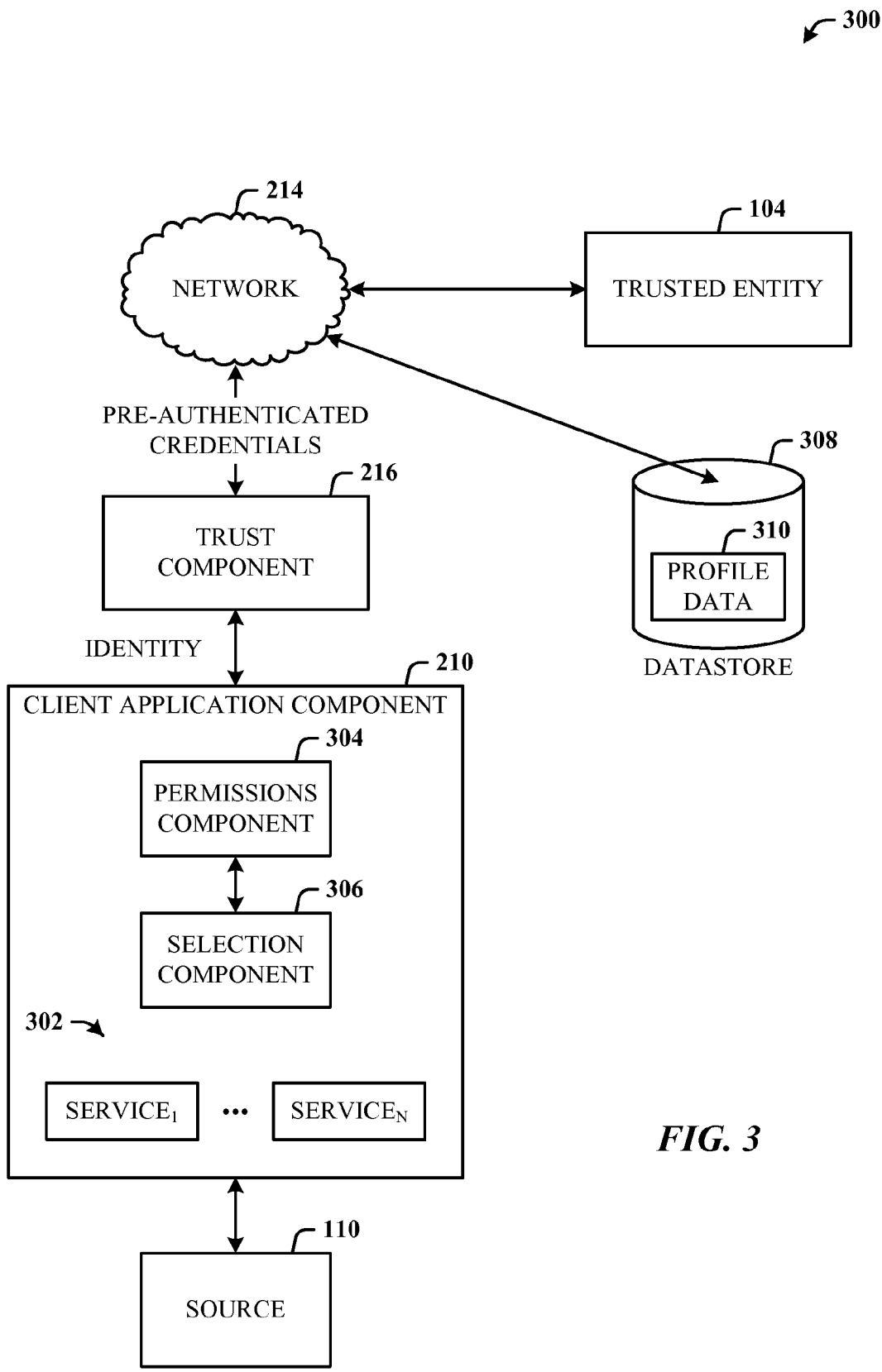
FIG. 3 illustrates a system for applying selectivity to application services or functionality based on the pre-authenticated credentials.

FIG. 3 illustrates a system 300 for applying selectivity to application services or functionality based on the pre-authenticated credentials. Here, the client application 210 includes multiple services or functionality 302 (denoted $SERVICE_1, \ldots, SERVICE_N$, where N is a positive integer) one or more of which can be utilized to facilitate the user experience for the desired communications. The pre-authenticated credentials obtained from the trusted entity 104 by the trust component 216 can further include profile data or information that defines access to the services or functionality 302. Permissions information can be included and processed by a permissions component 304 of the client component 210 that extracts the permissions information for ultimately determining which of the services 302 can be exposed and/or the level (or degree) of a given service to expose. A selection component 306 facilitates selection of the one or more services 302 that will ultimately be employed for the communications between the source 110 and destination.

The system 300 illustrates a datastore 308 of user profile data 310 that can be accessed based on one or more pieces of data in the pre-authenticated credentials as provided after authentication, or in preparation for assembling the pre-authenticated credentials. The datastore 308 can reside as a separate network node or in association with the trusted entity 104. The profile data 310 can include QoS information, accounting information, personality information, and so on, any amount of which can be transmitted in the pre-authenticated credentials or along therewith.

In one example, in the case of an automated attendant (or interactive voice response (IVR)) system, the implementation can include the offering of powerful authorization features by leveraging the user's identity. A user can pre-configure a personality skin, which includes attributes associated with being chatty, stodgy, brisk, verbose, etc., as well as others. This information can then be activated automatically as part of the attendant dialog after the user system receives the pre-authenticated credentials. Other data can include a trusted long distance service based on authentication of an improved dial plan. Moreover, different behavior can be based on dial plans (essentially providing the caller an internal caller experience that is different from when the caller is an external caller that is not allowed to dial long distance calls).

Other examples include automatically invoking most-recently-used (MRU) data such that the caller always is presented with the correct John Smith rather than having to navigate of list of multiple instances of the same name. Other capabilities include, for example, leveraging rules invoked in the mid-tier system, employing probabilistic stacking from buildings/location, learning and reasoning about caller and/or callee behavior, call interactions, call location information, accessing and searching contacts information or buddy lists from other applications, and so on.

Figure 4:
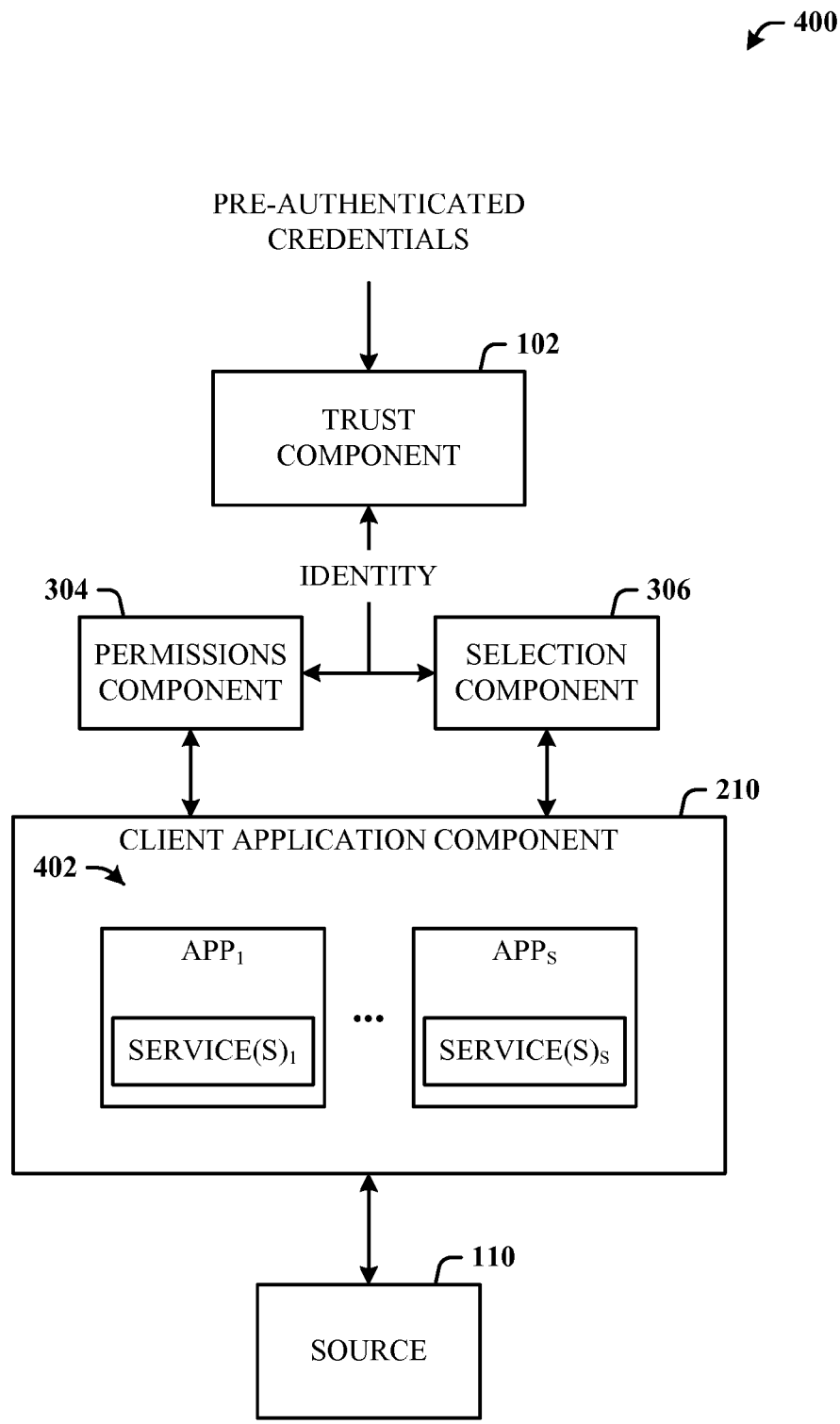
FIG. 4 illustrates a system where different services from correspondingly different applications can be accessed based on the pre-authenticated credentials information.

FIG. 4 illustrates a system 400 where different services from correspondingly different applications can be accessed based on the pre-authenticated credentials information. The trust component 102 (similar to trust component 216 of FIG. 2) receives and processes the pre-authenticated credentials, and forwards portions thereof and/or associated profile information to one or both of the permissions component 304 and the selection component 306 for the selection and exposure, in the client application component 210, of the functionality or services of multiple client applications 402 (denoted $APP_1, \ldots, APP_S$) having corresponding services (denoted $SERVICE(S)_1, \ldots, SERVICE(S)_S$).

The permissions can include exposing one service of one of the applications 402 and another service of another of the applications 402, as facilitated by the selection component 306. Additionally, as described supra, a service can be selected, but the level of the service is reduced or increased based on the credentials and/or associated profile data. In other words, permission to expose a service is not permission to utilize the full functionality of the service; however, it can facilitate full exposure, as configured.

When the source 110 is activated by the client user, this can automatically trigger searching for the pre-authenticated credentials by accessing known sources of such information, for example, the trusted entity, or other similarly designated sources. In an alternative implementation, certain user interaction with the client component 210 facilitates search and retrieval of the credentials. This interaction can includes seeking certain services, dialing a certain number or address, and other types of information that can be used to infer intent of the user.

Figure 5:
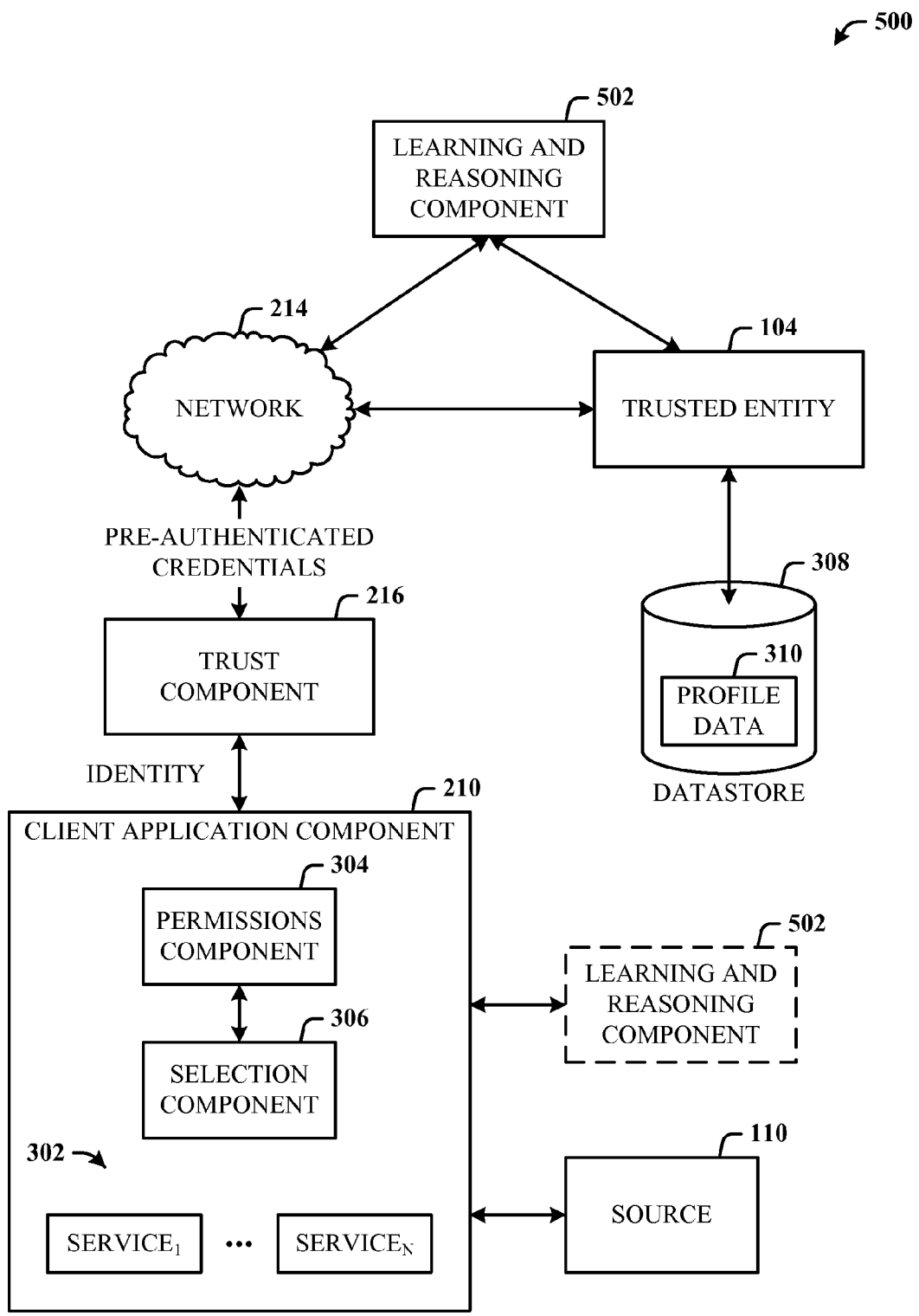
FIG. 5 illustrates a system that employs a machine learning and reasoning (LR) component which facilitates automating one or more features.

FIG. 5 illustrates a system 500 that employs a machine learning and reasoning (LR) component 502 which facilitates automating one or more features. The subject architecture (e.g., in connection with selection) can employ various LR-based schemes for carrying out various aspects thereof. For example, a process for determining what information to include in the pre-authenticated credentials or in association therewith can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)$=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

For example, over time an opt-in or opt-out setting can be changed and/or triggered based on learned user interaction behavior. In other words, based on the number of times the users interacts with the system, the level of expertise can be increased in accordance with a learned or computed improvement in user interaction. Along theses lines, as the user progresses in expertise, fewer suggestions or helping prompts will be presented thereby providing a progressively efficient and effective experience over time. A user who progresses to an expert level will not be annoyed or hindered with the same beginner-level prompts or information that have been surpassed. Alternatively, the suggestions or prompts can increase in complexity or be more obscure as the user progresses to present more detailed information about behavior in which the user appears to be frequently interested.

In another example of learning and reasoning, if the user routinely, most recently, or based on the past two weeks has requested or voiced to the auto attendant a particular user, a list of users can be presented that is more focused and which can be more specific to a product group, for example, that will be presented. This information can be automatically extracted from the user contacts, for example, or other sources of information of the user. This can also be learned based on user interaction with the system and/or applications.

Stacking of information presented to the user when the user is to be presented with a listing of potential choices can be based on geographic location. For example, probabilistic stacking can be facilitated by reasoning about a Joe Smith located five miles away in a company building versus a Joe Smith located in an adjacent building, and who in all likelihood would be in the same working group, physically contacted more often, and so on.

Again, these are features that can be communicated as part of the credentials or in association therewith when received by the trust component 216 (or trust component 102 of FIG. 1).

Figure 6:
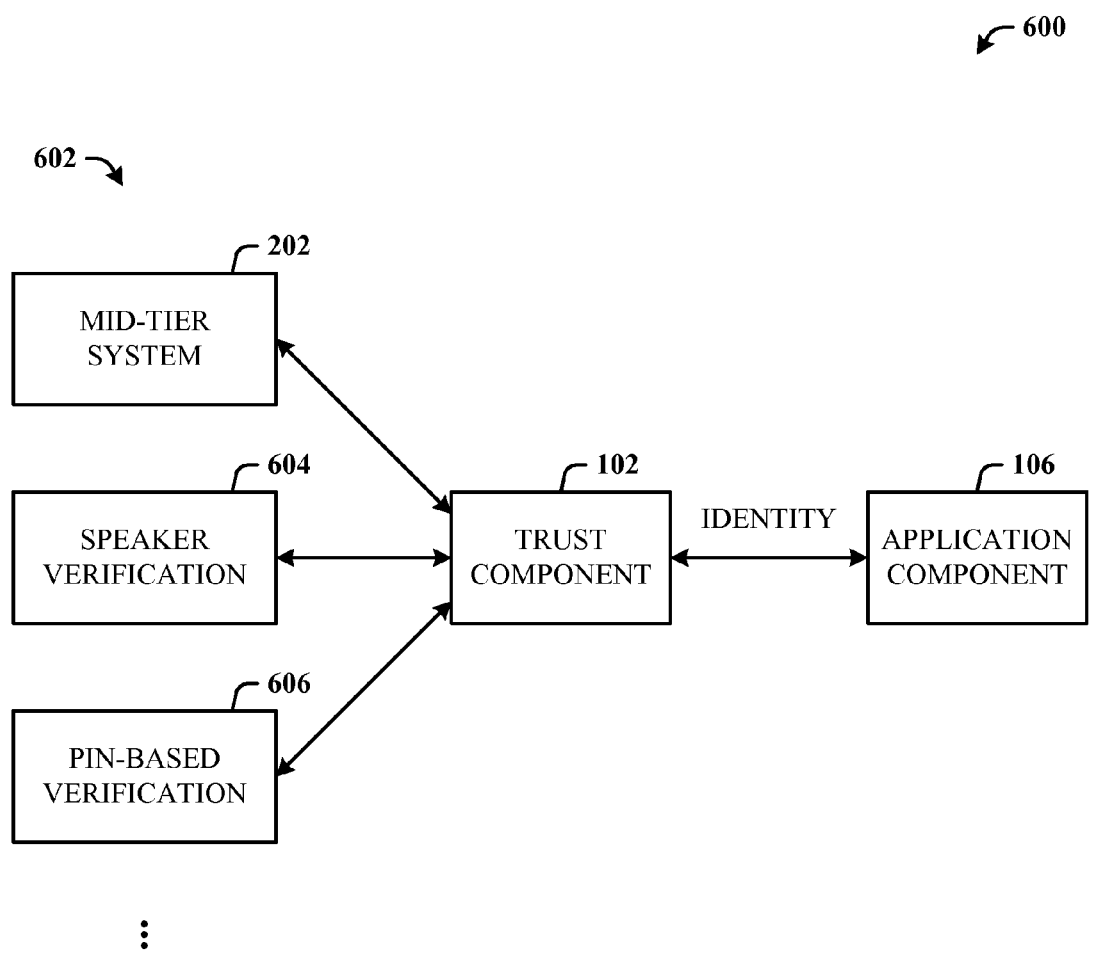
FIG. 6 illustrates one or more sources of credentials information that can be received and processed by the trust component for pre-authentication credentials.

FIG. 6 illustrates a system 600 of one or more sources 602 of credential information that can be received and processed by the trust component 102 for pre-authentication credentials. The sources 602 include the mid-tier system 202 of FIG. 2 for obtaining and generating the pre-authentication credentials for use by the application component 106. In addition to, or separately from the mid-tier system authentication capabilities, speaker verification 604 can be employed as a means of creating and providing the pre-authentication credentials to the trust component 102. Again, in addition to, or separately from the mid-tier system authentication capabilities and speaker verification 604, PIN-based verification 606 can be employed as a means of creating and providing the pre-authentication credentials to the trust component 102. Other sources can be employed including biometrics, and so on.

The trust component 102 is shown as a component which can take input from any or all of these sources 602. However, in practice, each of the sources 602 can have a dedicated trust component. The output of the trust component 102 is the validation of the identity to the application 106, which can then treat the communications (or session) as authenticated, and apply authorization, as necessary, to a caller in terms of information access and transactional capabilities.

Figure 7:
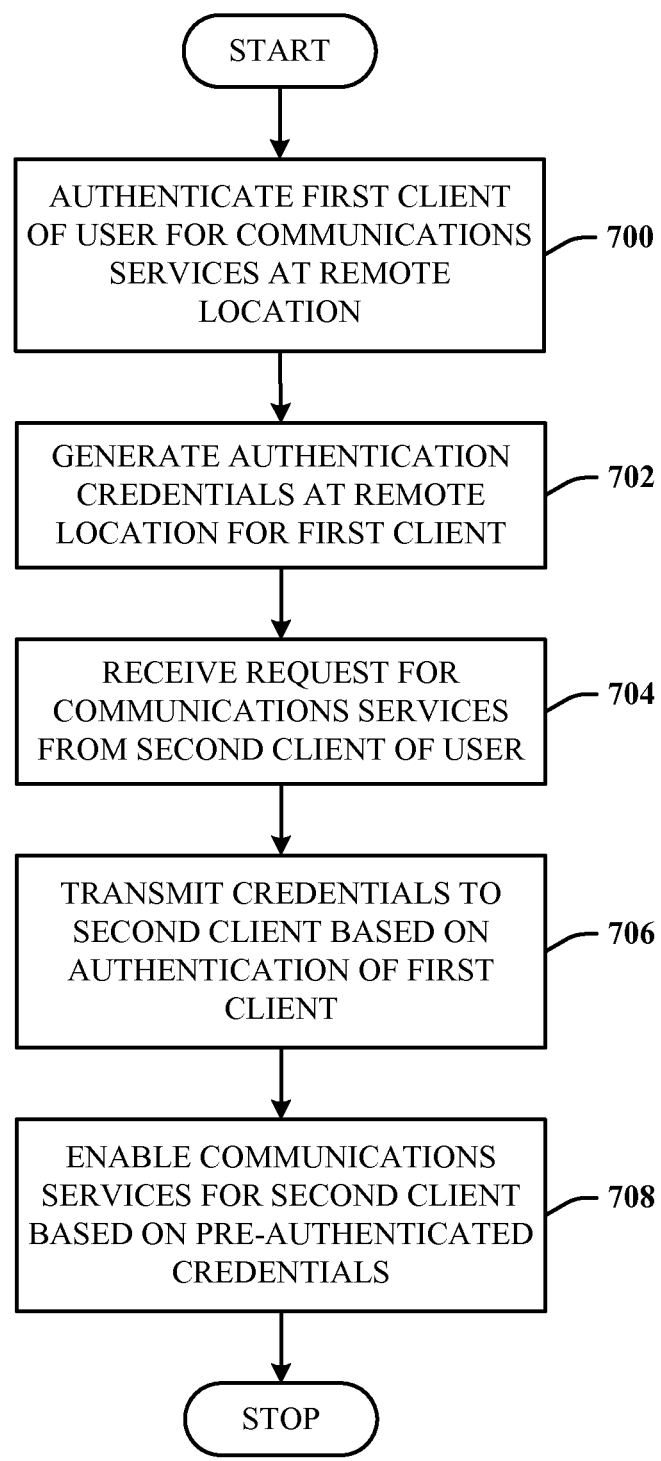
FIG. 7 illustrates a method of authentication processing.

FIG. 7 illustrates a method of authentication processing. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 700, a first client of a user is authenticated for communications services at a remote location. At 702, authentication credentials are created at the remote location for the first client. At 704, a request is received for communications services from a second client of the user. At 706, the credentials are transmitted to the second client based on authentication of the first client. At 708, communications are enabled for the second client based on the pre-authenticated credentials.

Figure 8:
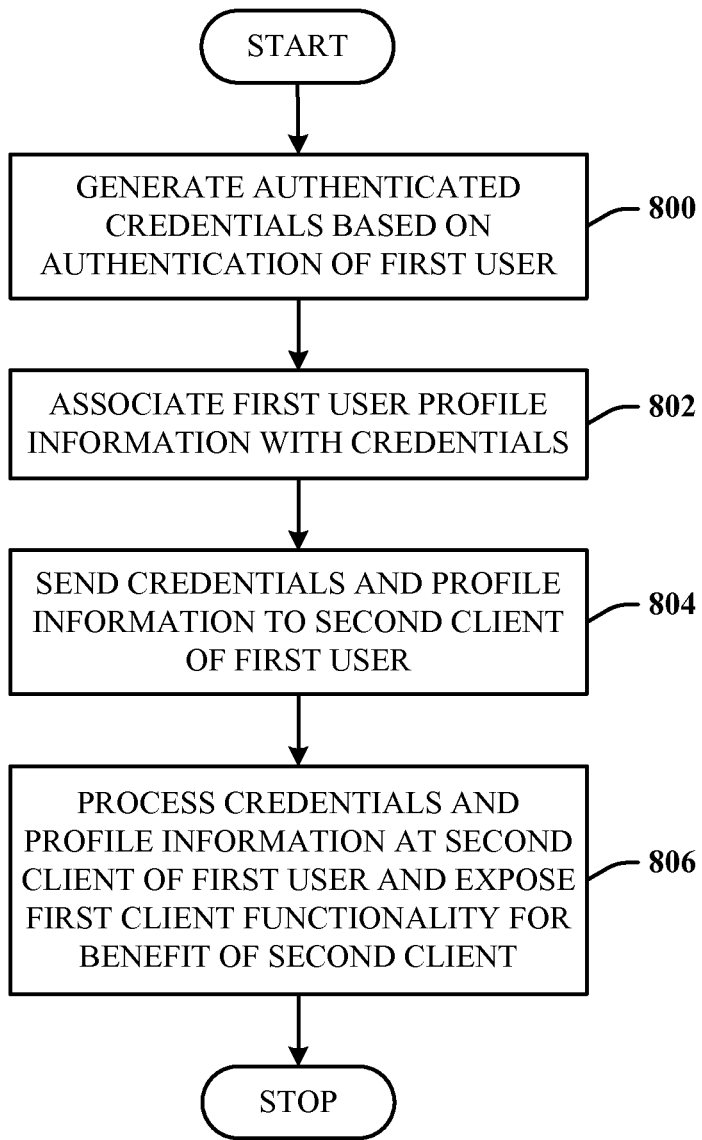
FIG. 8 illustrates a method of processing user profile information associated with the authenticated credentials.

FIG. 8 illustrates a method of processing user profile information associated with the authenticated credentials. At 800, authenticated credentials are generated based on authentication of a first user. At 802, first user profile information is associated with the credentials. At 804, the credentials and profile information are sent to a second client of the first user. At 806, the pre-authenticated credentials and profile information are processed at the second client of the first user to expose first client functionality for the benefit of the second client.

Figure 9:
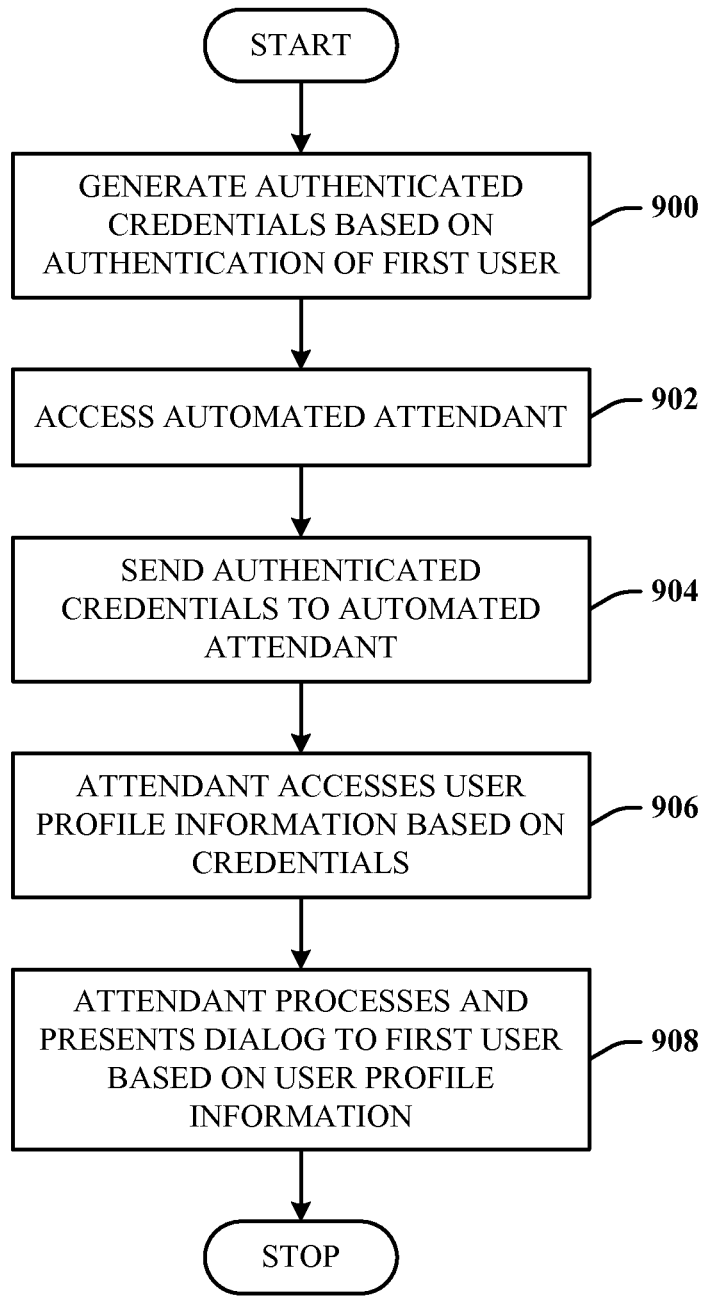
FIG. 9 illustrates a method of call processing using an automated attendant and pre-authenticated credentials.

FIG. 9 illustrates a method of call processing using an automated attendant and pre-authenticated credentials. At 900, authenticated credentials are generated based on authentication of first user. At 902, the first user accesses the attendant. At 904, the pre-authenticated credentials are sent to the attendant. At 906, the attendant accesses user profile information associated with the pre-authenticated credentials. The attendant processes and presents dialog to the first user based on the user profile information.

Figure 10:
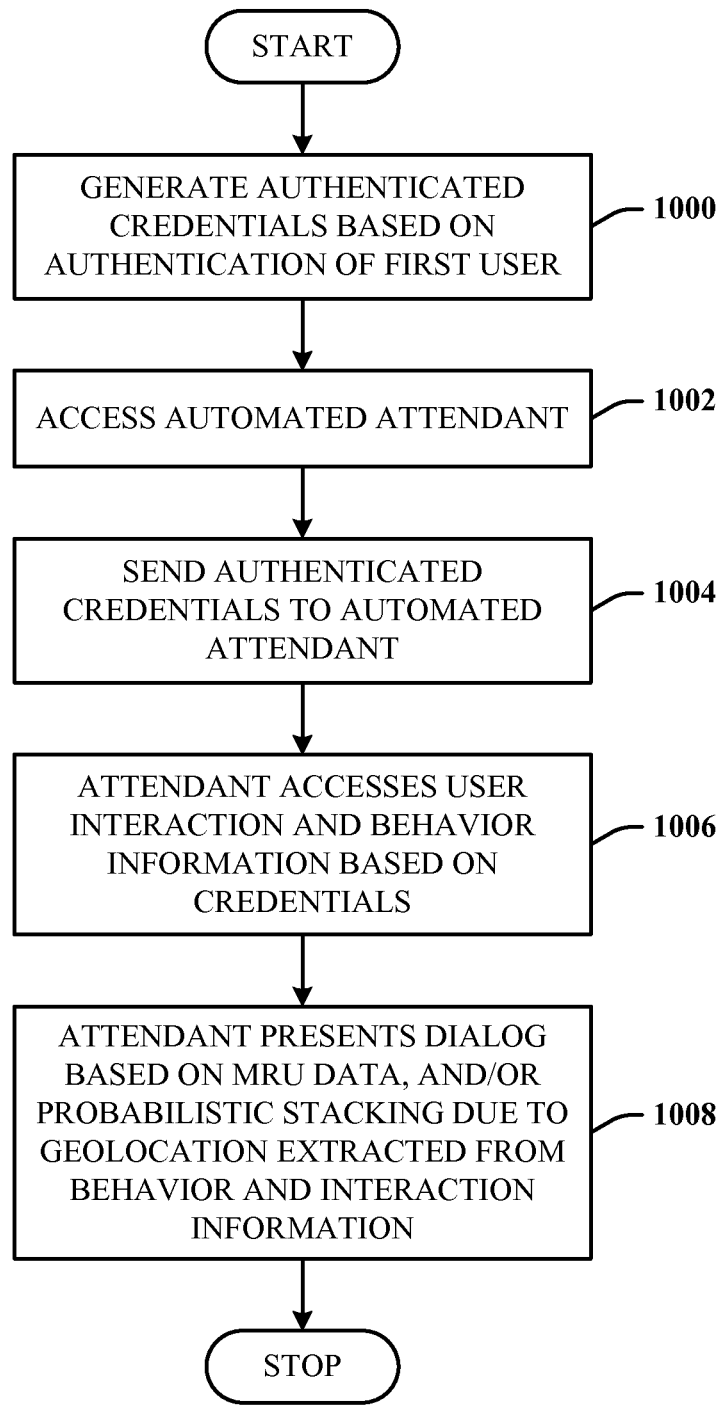
FIG. 10 illustrates a method of processing user interaction and behavior information based on pre-authenticated credentials.

FIG. 10 illustrates a method of processing user interaction and behavior information based on pre-authenticated credentials. At 1000, authenticated credentials are generated based on authentication of a first user. At 1002, the first user accesses the attendant. At 1004, the pre-authenticated credentials are sent to the attendant. At 1006, the attendant accesses user interaction and behavior information based on the credentials. At 1008, the attendant presents dialog based on MRU data, and/or probabilistic stacking due to geolocation information extracted from the interaction and behavior information.

Figure 11:
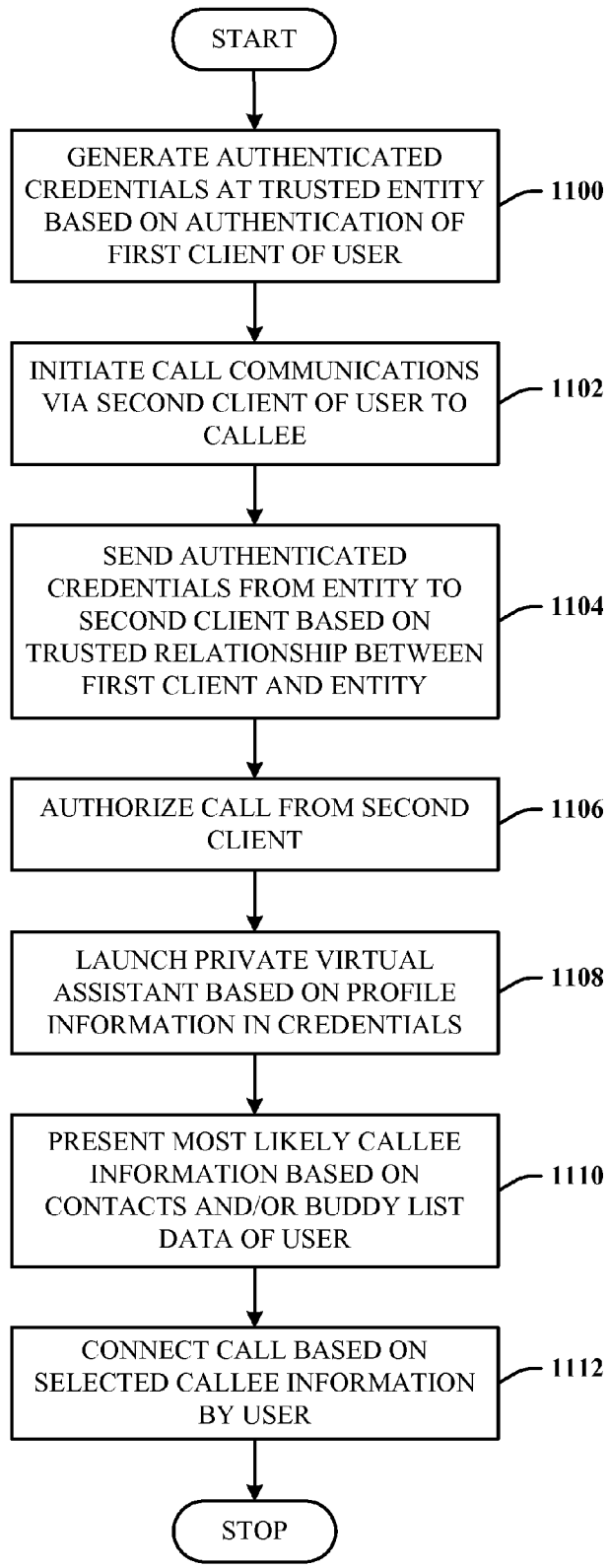
FIG. 11 illustrates a method of call processing using a private virtual assistant.

FIG. 11 illustrates a method of call processing using a private virtual assistant. At 1100, authenticated credentials are generated at a trusted entity based on authentication of first client of a user. At 1102, call communications are initiated via a second client of the user to a callee. The call can be a VoIP call using SIP. At 1104, the authenticated credentials are then sent from the entity to the second client based on the trusted relationship between the first client and the entity. At 1106, the call is authorized form the second client. At 1108, a private virtual assistant is launched based on profile information in the credentials. At 1110, most-likely callee information is presented based on contacts and/or buddy list data of the user. At 1112, the call is connected based on callee information selected by the user.

Figure 12:
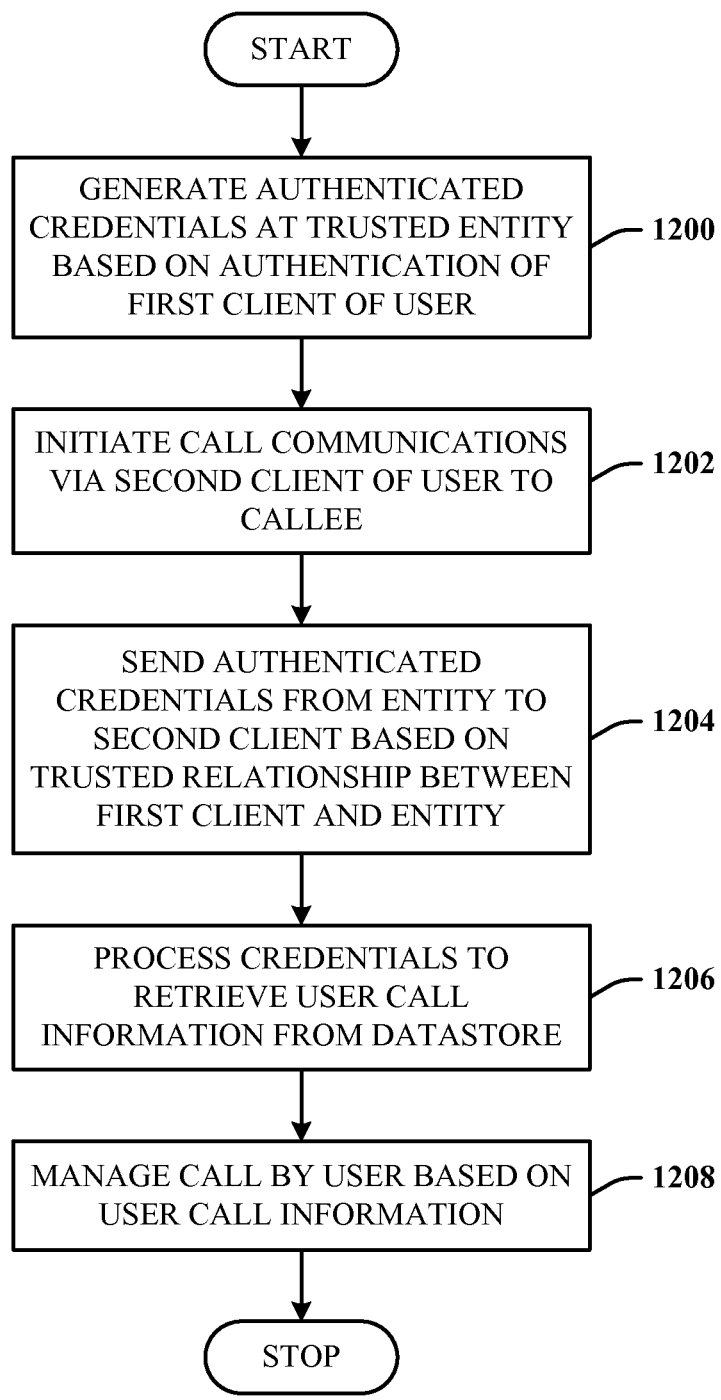
FIG. 12 illustrates a method of processing user call information based on the pre-authenticated credentials.

FIG. 12 illustrates a method of processing user call information based on the pre-authenticated credentials. At 1200, authenticated credentials are generated at a trusted entity based on authentication of first client of a user. At 1202, call communications are initiated via a second client of the user to a callee. At 1204, the authenticated credentials are then sent from the entity to the second client based on the trusted relationship between the first client and the entity. At 1206, the credentials are processed to retrieve user call information from a datastore. At 1208, the call by the user is managed based on the user call information.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
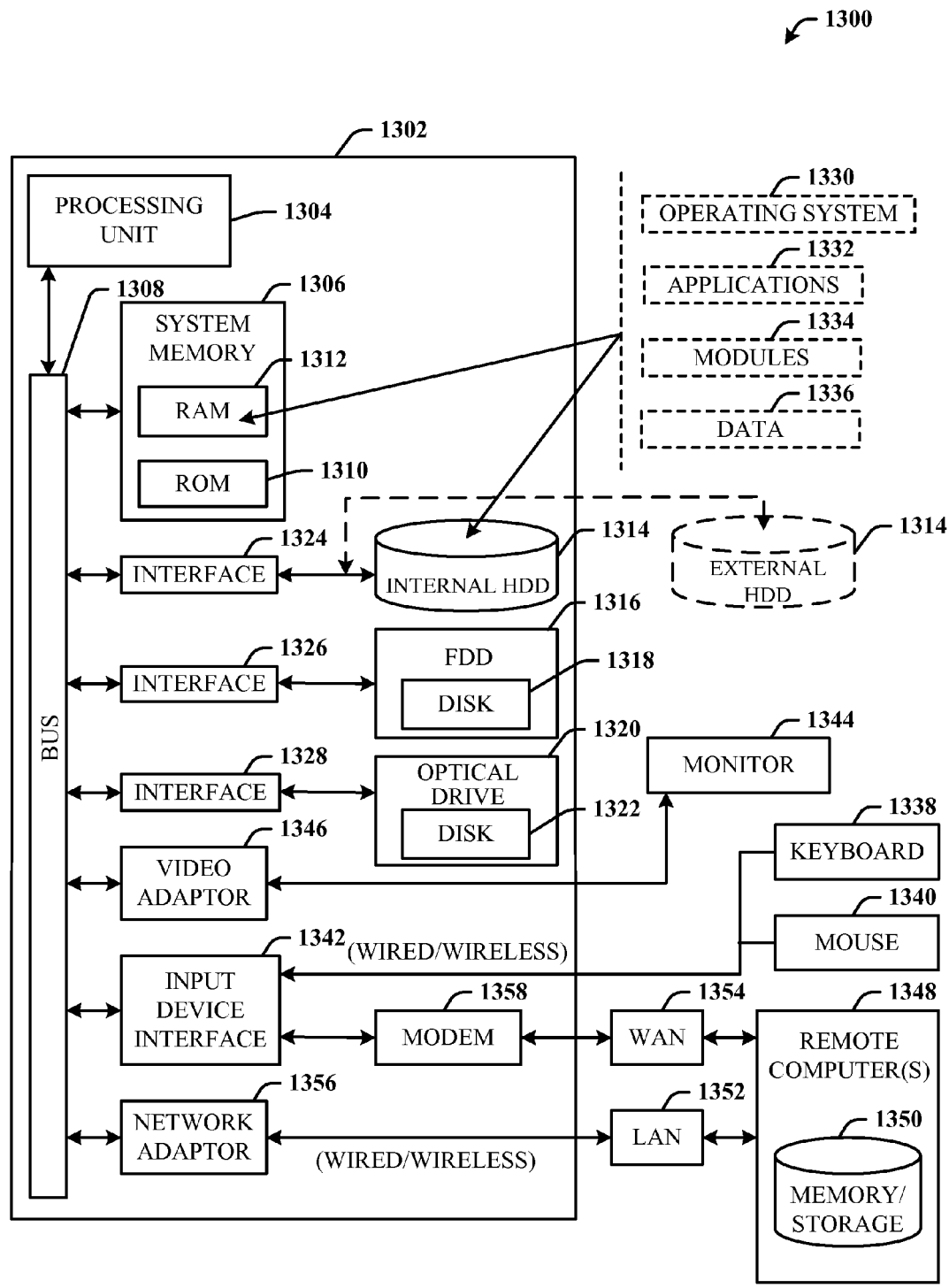
FIG. 13 illustrates a block diagram of a computing system operable to execute pre-authentication credential creation and/or processing in accordance with the disclosed architecture.

Referring now to FIG. 13, there is illustrated a block diagram of a computing system 1300 operable to execute pre-authentication credential creation and/or processing in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302, the computer 1302 including a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1312, including an operating system 1330, one or more application programs 1332, other program modules 1334 and program data 1336. The one or more application programs 1332 and other program modules 1334 can include the trust component 102, trusted entity 104, and application component 106 of FIG. 1, the mid-tier application component 212, authentication component 204, client trust components (216 and 220), and client application component 210 of FIG. 2, the permissions component 304, selection component 306, and services 302 of FIG. 3 and, learning and reasoning component 503 of FIG. 5, for example.

All or portions of the operating system, applications, modules, and/or data can also be cached in the RAM 1312. It is to be appreciated that the disclosed architecture can be implemented with various commercially available operating systems or combinations of operating systems.

A user can enter commands and information into the computer 1302 through one or more wired/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 14:
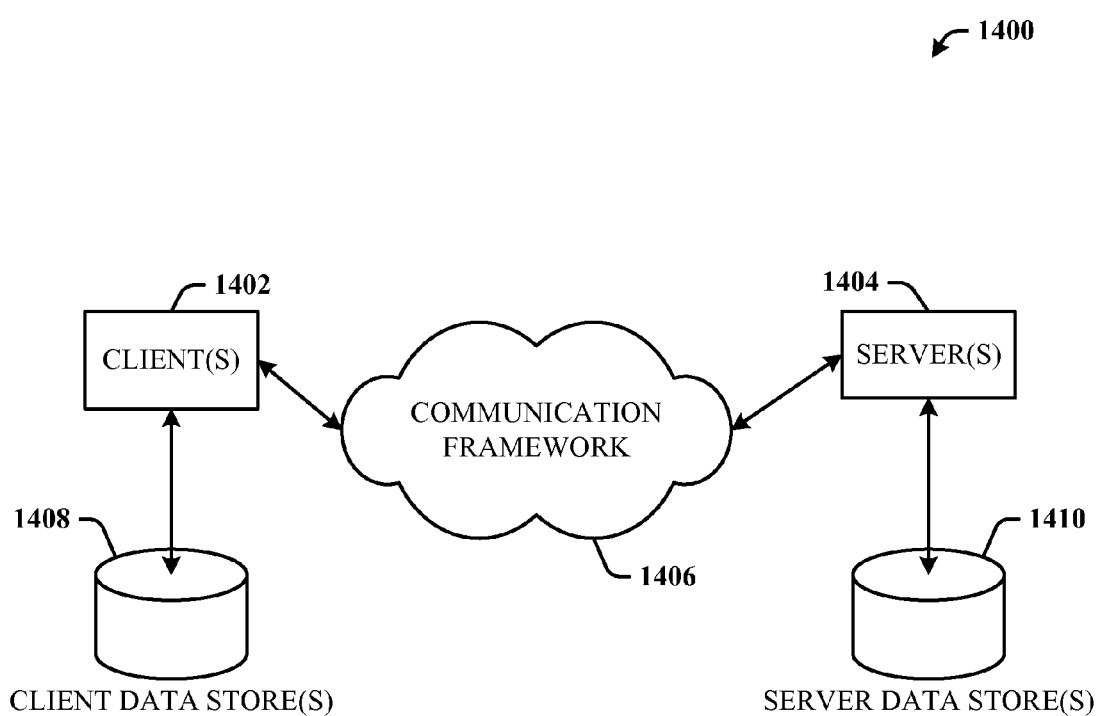
FIG. 14 illustrates a schematic block diagram of an exemplary computing environment that can facilitate execute pre-authentication credential creation and/or processing in accordance with the disclosed architecture.

Referring now to FIG. 14, there is illustrated a schematic block diagram of an exemplary computing environment 1400 that can facilitate execute pre-authentication credential creation and/or processing in accordance with the disclosed architecture. The system 1400 includes one or more client(s) 1402. The client(s) 1402 can be hardware and/or software (e.g., threads, processes, computing devices). The client(s) 1402 can house cookie(s) and/or associated contextual information, for example.

The system 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An authentication method performed by a computer system executing machine-readable instructions, the method comprising acts of:
   receiving, by a trust component at a first client, pre-authenticated credentials for voice communications services at a remote location from a trusted entity, wherein the voice communications services include an IP-based phone call;
   transmitting, by a transmitting component, the pre-authenticated credentials to a second client of the user based on authentication of the first client;
   receiving, by an application component at the first client, a request for a voice communications service from the second client of the user and providing the voice communications service based on the pre-authenticated credentials received by the trust component, wherein the pre-authenticated credentials include a level of permission related to the voice communications service that is provided by the application component; and
   establishing the voice communications service for the second client.

2. The method of claim 1, wherein the pre-authenticated credentials are received via a media session protocol.

3. The method of claim 2, wherein the media session protocol is session initiation protocol (SIP).

4. The method of claim 1, wherein the trusted entity is a communications server, the pre-authenticated credentials include at least one of device identity data or user identity data, and the voice communications service facilitates voice communications between a mobile device and the communications server.

5. The method of claim 1, wherein the pre-authenticated credentials include a level of permission related to exposure of functionality of the voice communications service based on the credentials.

6. The method of claim 1, wherein the trusted entity receives the pre-authenticated credentials from another trusted entity.

7. The method of claim 1, further comprising selecting, by a permissions component, the voice communications service from one or more applications based on a permission associated with the pre-authenticated credentials.

8. The method of claim 1, wherein the trust component and the application component are of the first client that receives the pre-authenticated credentials for connecting the IP-based phone call via the second client to a remote destination.

9. The method of claim 1, further comprising employing, by a machine learning and reasoning component, at least one of a probabilistic and statistical-based analysis to prognose or infer an action that is desired to be automatically performed.

10. The method of claim 1, wherein the pre-authenticated credentials include user profile information that defines a quality-of-service for communicating with a destination device.

11. An authentication processing method performed by a computer system executing machine-readable instructions, the method comprising acts of:
receiving authenticated credentials generated for communications services at a remote location for a first client of a user, wherein the communications services include an IP-based phone call;
receiving a request for communications services from a second client of the user;
transmitting the authenticated credentials to the second client based on authentication of the first client; and
establishing the communications services for the second client based on the authenticated credentials, wherein the authenticated credentials include a level of permission related to the communications services such that a level of functionality of the communication services is reduced or increased based on the authenticated credentials.

12. The method of claim 11, further comprising accessing the remote location via a web interface, which remote location is a network-based middle-tier communications server that processes SIP-based communications from the first client.

13. The method of claim 11, wherein the first client or the second client is part of a voice-over-IP communications device.

14. The method of claim 11, further comprising including personality information in the authenticated credentials that changes how the second client, which is an automated attendant, interacts with a user.

15. The method of claim 11, further comprising employing more recently-used information based on the authenticated credentials to present information to the user for selection.

16. The method of claim 11, further comprising controlling quality-of-service parameters for the second client based on the authenticated credentials.

17. The method of claim 11, further comprising automatically exposing functionality of a personal virtual assistant based on the authenticated credentials, the functionality exposed based on knowledge of a contact list or buddy list.

18. The method of claim 11, further comprising selecting services from different applications of the first client based on the authenticated credentials and providing the selected services for communications by the second client.

19. The method of claim 11, further comprising learning and reasoning about client or user interactive behavior and automating presentation of information to the user based thereon.

20. An authentication method performed by a computer system executing machine-readable instructions, the method comprising acts of:
receiving, by a trust component at a first client, pre-authenticated credentials for voice communications services at a remote location from a trusted entity;
transmitting, by a transmitting component, the pre-authenticated credentials to a second client based on authentication of the first client; and
receiving, by an application component at the first client, a request for communications services from the second client of the user and providing an application service based on the pre-authenticated credentials received by the trust component, wherein the pre-authenticated credentials include a level of permission related to a type of the application service, and the trust component and the application component are of the first client that receives the pre-authenticated credentials for connecting an IP-based phone call via the second client to a remote destination.

* * * * *